(12) United States Patent
Hogg

(10) Patent No.: US 6,341,739 B1
(45) Date of Patent: *Jan. 29, 2002

(54) PROCESSING OF CERAMIC MATERIALS

(75) Inventor: Christopher Stirling Hogg, Luxulyan (GB)

(73) Assignee: Imerys Minerals Limited, Cornwall (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,039

(22) Filed: Dec. 29, 1997

(30) Foreign Application Priority Data

Jan. 11, 1997 (GB) .............................. 9700527

(51) Int. Cl.$^7$ ................................ B02C 23/08
(52) U.S. Cl. ................ 241/24.1; 241/24.12; 241/24.13; 241/24.14
(58) Field of Search .......................... 241/24.1, 24.11, 241/24.12, 24.13, 24.14, 21, 27

(56) References Cited

U.S. PATENT DOCUMENTS 5,065,946 A * 11/1991 Nishida et al. ............... 241/16
5,735,946 A * 4/1998 Bloodworth et al. .. 241/24.1 X

FOREIGN PATENT DOCUMENTS

| DE | 3617489 A | 11/1987 |
| DE | 290860 A | 6/1999 |
| EP | 723932 | 7/1996 |

OTHER PUBLICATIONS

Turbomilling: A Processing Technique for Advanced Ceramics by Jesse L. Hoyer in Materials and Manufacturing Processes, vol. 9, No. 4, 623–636, 1994.

WPI Abstract Ascression No: 87–111610/16 and JP620056309A (Denki Kagagu) Mar. 12, 1987.
JOP and JAPIO Abstract No. 03056634 and JP630180260A (Denki Kagaku) Feb. 1, 1990.
JPO and JAPIO Abstract No. 02139409 and JP600193872A (Denki Kagaku) Mar. 12, 1987.
JPO and JAPIO Abstract No. 01644208 and JP580230929A (Denki Kagaku) Jul. 1, 1985.
Patent abstracts of Japan, vol. 017, No. 644 (C–1134) Nov. 30, 1993 & JP05201770A (Toshiba Mat. Eng. K.K.).
Aug. 10, 1993 (See copy of translation) of JP 93 201770.

* cited by examiner

Primary Examiner—John M. Husar
(74) Attorney, Agent, or Firm—Finnegan, Henderson, Farabow, Garrett and Dunner, L.L.P.

(57) ABSTRACT

A process for treating a nitride-containing ceramic material which includes the following steps:

(1) comminuting the material to produce a particulate ceramic material having a particle size distribution such that at least 40% by weight of the particles have an equivalent spherical diameter (esd) smaller than 2 μm; and (2) a ferrosilicon separation step comprising one or both of the following steps:
   a) subjecting the particulate ceramic material produced in step 1 to differential sedimentation in a liquid medium to produce substantial separation of a light fraction from a heavy fraction, ferrosilicon required to be separated being included in the heavy fraction and refined particulate ceramic material being included in the light fraction;
   b) subjecting a suspension of the particulate ceramic material to magnetic separation to produce substantial separation of magnetic particulate material from non-magnetic particulate material, refined particulate ceramic material being included in the non-magnetic material.

22 Claims, 4 Drawing Sheets

PROCESSING OF CERAMIC MATERIALS

BACKGROUND OF THE INVENTION

The present invention relates to the processing of ceramic materials and, in particular, concerns a process for producing improved ceramic materials comprising nitride-containing materials.

Nitride-containing ceramics which are known as 'advanced ceramics' are used in a wide range of applications, for example in industrial wear parts and bearings, refractories, welding components and molten metal handling materials, cutting tools for metal turning, dies for metal extrusion and wire pulling, military applications and body armour, electronics and composite materials. In aggressive and high temperature environments, the corrosion resistance, strength, toughness and wear resistance of these advanced ceramics offer considerable advantages over the sophisticated metal alloys currently in use.

The process of making metal nitrides by the carbothermal reduction and subsequent or simultaneous nitriding of appropriate metal oxides is well known. A variety of metal or semi-metal nitrides can be made in this way, including silicon nitride, aluminium nitride, boron nitride and titanium nitride. By way of example, an appropriate metal oxide may be mixed with a suitable amount of carbon and the mixture heated to a temperature in the range of from 1300 to 1600° C. in a flowing stream of nitrogen gas. Oxygen is removed from the oxide as carbon monoxide, and is replaced by nitrogen, with the result that the oxide is partially or fully converted to the nitride.

Nitride-containing ceramic materials of special interest on account of their superior refractory and mechanical properties are the family of silicon aluminium oxynitride materials, which are known collectively as "sialons". The term "sialon" which is now widely used to identify this type of material is derived from the chemical symbols Si, Al, O and N of its constituent elements. Sialons are believed to be solid solutions of aluminium oxide in silicon nitride, and those which have the most desirable properties generally have a chemical composition which can be represented by the formula:

$$Si_{6-z}Al_zO_zN_{8-z}$$

where z is greater than zero and less than or equal to 4.2.

Materials of this type are generally prepared by intimately mixing silicon nitride, alumina and aluminium nitride in appropriate proportions, and causing them to react together at a high temperature in an inert atmosphere, which may conveniently be nitrogen gas. Some types of sialon can be made by carbothermal reduction and nitriding of an aluminosilicate. Thus sialon with the chemical composition $Si_3Al_3O_3N_5$ can be made from kaolinite, which is the principal constituent of many clays.

Most natural aluminosilicates, including kaolin clay, usually contain small amounts or iron, either combined with the aluminosilicate, or as the free oxide or oxyhydroxide. It is well known that the carbothermal reduction and nitriding siliceous materials can be catalysed by the presence of iron oxides in the feed material. The conversion of silica to silicon nitride, and the conversion of kaolin to sialon are both catalysed in this way. If insufficient iron is present naturally, extra iron can be added, usually in the form of the oxide. In the presence of free silica, and in the strongly reducing conditions prevailing during the carbothermal reaction, the iron oxide is converted to ferrosilicon. Ferrosilicon is liquid at temperatures above 1250° C., and it is generally accepted that the presence of this liquid phase greatly enhances the reduction and nitriding of the remaining silica or aluminosilicate.

However, it has not been widely appreciated that the ferrosilicon can have a deleterious effect on the mechanical and/or refractory properties of the resulting nitride-containing ceramic after sintering.

SUMMARY OF THE INVENTION

According to the present invention there is provided a process for treating a nitride-containing ceramic material which includes (1) comminuting the material to produce a particulate ceramic material having a particle size distribution such that at least 40% by weight of the particles have an equivalent spherical diameter (esd) smaller than 2 μm; and (2) applying a ferrosilicon separation step comprising one or both of the following steps:

a) subjecting the particulate ceramic material produced in step 1 to differential sedimentation in a liquid medium to produce substantial separation of a light fraction from a heavy fraction, ferrosilicon required to be separated being included in the heavy fraction, and refined particulate ceramic material being included in the light fraction;

b) subjecting a suspension of the particulate ceramic material to magnetic separation to produce substantial separation of magnetic particulate material from non-magnetic particulate material, refined particulate ceramic material being included in the non-magnetic material.

DESCRIPTION OF THE INVENTION

As described earlier, the present invention involves in the treatment of a nitride-containing ceramic material, eg. a sialon, by a comminution step followed by one or more ferrosilicon removal steps selected from steps a) and b) defined earlier.

Comminution processes are known per se. Comminution of advanced ceramic materials is described for example in Hoyer, J. L., "Turbomilling: a processing technique for advanced ceramics", Materials and Manufacturing Processes, 9 (4), pages 623–636, 1994.

We prefer to comminute the ceramic material in step (1) by grinding in an aqueous medium using a hard particulate grinding medium.

In step 2 (a) the differential sedimentation is desirably carried out in the presence of a dispersing agent. Preferably, the liquid medium is an aqueous medium.

In step 2 (b) the suspension may be formed in an aqueous medium. The magnetic separation may be effected by application of a magnetic field having an intensity of at least 0.05 tesla in the region of the suspension to be treated.

The nitride-containing ceramic material may be, for example, silicon nitride which is prepared by carbothermal reduction of a silica, or a β'-sialon which is prepared by carbothermal reduction of an aluminosilicate material. In the case of β'-sialon, this may advantageously be prepared in accordance with the method which is described in EP-A-0723932 in which a reaction mixture comprising from 70% to 90% by weight of a hydrous or calcined natural aluminosilicate material, such as a kaolin clay, and from 30% to 10% by weight of a carbonaceous material is calcined at a temperature in the range of from 1300° C. to 1600° C. in a current of nitrogen gas in an enclosed furnace, wherein the particles of the reaction mixture are maintained in substantially continuous motion relative to one another and to the nitrogen gas and the residence time of the reaction mixture in the furnace is not greater than 3 hours.

Where the comminution step (1) in the method according to the first aspect comprises a wet grinding step such a step may be carried out as follows. The ceramic material is suspended in water to form a suspension containing at least 10% by dry weight of the ceramic material. If the suspension contains more than about 40% by dry weight of the ceramic material, a dispersing agent for the ceramic material is preferably dissolved in the water. The dispersing agent is preferably free of alkali metal cations, since these can cause fluxing of the ceramic material. The dispersing agent may be, for example, ammonia or an ammonium salt of a polycarboxylic acid. A particularly suitable dispersing agent is one which can be substantially completely removed from the ceramic material after the treatment in accordance with the invention. Especially preferred is ammonia solution, which is added in a quantity such as to maintain the pH of the suspension at a value of at least 8.0. The ammonium salt of a polycarboxylic acid, if used, is preferably present in an amount of from 0.1 to 1.0% by weight, based on the weight of dry ceramic material.

The hard particulate grinding medium used in the comminution step (where a wet grinding step) should have a Moh hardness of at least 6, and may comprise, for example, grains of silica sand, alumina, zirconia, or of the product of calcining a kaolinitic clay under conditions such that it is converted predominantly to mullite. The grinding medium preferably consists of particles substantially all of which have a diameter between 100 μm and 5 mm. The grinding medium more preferably has a narrower particle size distribution such that substantially all of the particles have diameters in the range of from 250 μm to 2 mm. Most preferably substantially all of the particles have diameters in the range of from 1 to 2 mm.

A wet grinding step is conveniently performed in a vessel which is provided with an agitator which is rotated by means of an electric motor through suitable transmission means, such as a gearbox or belt or chain drive. Preferably the aqueous suspension of the ceramic material is subjected to agitation with the particulate grinding medium for a time sufficient to dissipate in the suspension at least 300 kJ of energy per dry kilogram of ceramic material.

The differential sedimentation step 2a) may be performed in a centrifuge, or, more preferably, by gravitational sedimentation. The suspension of the comminuted ceramic material is preferably first diluted, if necessary, with water so that the concentration of solids in the suspension is not more than about 20% by dry weight, and a dispersing agent of the type described under step 1) above is added, if it was not already added in step 1). In the process of gravitational sedimentation the aqueous suspension of the ground ceramic material is allowed to stand undisturbed in a suitable container for a time sufficient to permit the desired separation to take place. Different particles in the ground ceramic material settle to the bottom of the container at different rates dependent upon their size and specific gravity. According to Stokes' Law, the terminal velocity of a particle settling through a fluid under these conditions is given by $$v = 2r^2 g(s-r)/9h$$

where v is the terminal velocity,
r is the radius of the particle,
s is the specific gravity of the particle,
r is the specific gravity of the fluid,
h is the viscosity of the fluid, and
g is the acceleration due to gravity.

Thus the terminal velocity is a function of the difference in specific gravity between the particle and the fluid, (s−r).

Ferrosilicon has a specific gravity between 5.6 and 6.1, depending on its composition, while nitride-containing ceramics can have a lower specific gravity; for example sialon made from kaolin has a specific gravity of about 3.2. The terminal velocity, and hence settling rate, of a particle of ferrosilicon in water will be over twice as fast as that of a sialon particle of the same diameter. If a suspension of a mixture of nitride-containing ceramic, eg. sialon and ferrosilicon is allowed to sediment, ferrosilicon particles will settle out before nitride-containing, eg. sialon particles of the same size. Thus the differential sedimentation step 2a) serves the dual purposes of removing oversize particles of nitride-containing material, eg. sialon, which would be undesirable in the finished product because they would have a deleterious effect on sintered articles made from the product, and of preferentially removing impurities of high specific gravity, such as ferrosilicon.

Thus, a heavy fraction and a light fraction are obtained by the differential sedimentation. The light fraction, which is separated in a suitable manner eg. by decanting from the heavy fraction, contains the refined ceramic particulate product and the heavy fraction contains the ferrosilicon and other heavy impurities or coarse particles required to be separated. The separate product fraction may be further treated in a known way, eg. by dewatering, eg. by filtration and drying as described below.

The force exerted on a spherical particle of a magnetic material in a magnetic field is given by the formula:

$$F = \chi_m \frac{\pi D^3}{6} H \frac{dH}{dx}$$

wherein $\chi_m$ is the volume magnetic susceptibility of the material, D is the diameter of the particle, H is the magnetic field intensity and dH/dx is the rate of change of the magnetic field intensity with distance. From this formula it can be seen that the force on the particle is proportional not only to the magnetic field intensity but also to the rate of change of the magnetic field intensity with distance. Therefore a high-intensity magnetic field which changes rapidly with distance, in other words a very non-homogeneous field, may be used to separate a small particle of magnetic material from a non-magnetic material.

The magnetic separation step 2b) is conveniently performed by passing an aqueous suspension of the comminuted ceramic material through a magnetic separation chamber which is located in a magnetic field of intensity at least 0.05 tesla, and more preferably at least 0.1 tesla. The magnetic field may be provided by permanent magnets which are capable of generating a field of the required intensity, or by means of electromagnet coils. The upper limit of the magnetic field intensity is limited only by the cost of providing and running the apparatus necessary to generate such a field. The magnetic separation may be carried out in a magnetic separation chamber which preferably contains a porous magnetic matrix, or packing, which is of a corrosion resistant, ferromagnetic material, and may comprise, for example, a steel wool, or particles of regular shape, for example spherical, cylindrical or prismatic, or of a more irregular shape, such as filings, cuttings or turnings from a larger piece of a suitable material. The aqueous suspension should contain from 0.1 to 1.0% by weight, based on the dry weight of ground ceramic material, of a dispersing agent of the type described for step 1) above, and preferably has a solids concentration of not more than about 40% by weight, and more preferably not more than 20% by weight, based on the weight of dry ground ceramic material.

By the magnetic separation step, ferrosilicon in the magnetic material is separated from non-magnetic material comprising the refined nitride-containing ceramic material product.

On completion of step 2a) and/or step 2b), the treated ceramic particulate material may be further processed in a known way, eg. it may be dewatered and/or dried using one or more known steps. For example, the material may be dried by spray drying or dewatered, eg. by flocculation, eg. by pH reduction and filtration, followed by thermal drying of the filtered cake.

The dried material may be comminuted, eg. milled, to disperse lumps, packaged as a powder and transported to a user. The powder may include minor amounts of additive, eg. ytrria which will assist subsequent sintering by a user.

The dry powder received by a user may be employed by using ceramic powder processing procedures well known to those skilled in the art. Generally, to preform bodies having a desired shape, the ceramic powder is formed into the shape by castings, moulding, extruding or the like to produce a pre-sintered or 'green' body followed by one or more sintering steps of the body under appropriate known sintering conditions to give the required shaped ceramic article.

Pressing of a dry powder and slip casting of a wet slurry are two preferred ways of pre-forming the shaped body prior to sintering.

The present invention beneficially allows the known benefits obtained by the use of iron oxide in the feed material employed to produce a nitride-containing ceramic material to be retained whilst minimising or substantially eliminating problems associated with the presence resulting from the use of iron oxide of ferrosilicon in the ceramic product. As noted above, ferrosilicon is liquid at about 1200° C. and acts as a fluxing agent. Retention of substantial amounts of ferrosilicon in the ceramic material causes the mechanical properties of bodies sintered using the ceramic material at temperatures above 1200° C. to be seriously affected. For example, the mechanical strength and toughness of the body may be seriously reduced and there may be a tendency for the body to deform under stress in a process known as 'creep'. However, by minimising the presence of ferrosilicon these problems can be minimised or eliminated, thereby allowing the mechanical properties of the sintered body to be largely unaffected.

The extent to which the ferrosilicon separation steps 2(a) and 2(b) are effective in the removal of ferrosilicon depend upon the amount of ferrosilicon present in the ceramic particulate material and the kind of ferrosilicon present. Usually, ferrosilicon is present mainly as $Fe_3Si$ although constituents having compositions ranging from about 90% Si: 10% Fe to about 10% Si: 90% Si may also be present.

As exemplified hereinafter the equivalent $Fe_2O_3$ weight content of the particulate ceramic material may be reduced by either step 2(a) or step 2(b) (by a greater extent using both) to less than 10% of its original value (prior to application of the step(s)) thereby substantially minimising the problems caused by residual ferrosilicon.

The residual iron content of the particulate ceramic material expressed as percentage by weight $Fe_2O_3$ is desirably less than 0.5, especially less than 0.35, after treatment of the material in accordance with the method according to the first aspect.

According to the present invention in a second aspect there is provided a nitride-containing ceramic particulate material which is the product of the method according to the first aspect. The product may be a powder having a $d_{50}$ value less than 2 $\mu$m, desirably less than 1.5 $\mu$m, especially less than 1 $\mu$m, wherein $d_{50}$ is defined as the mean particle size of the particles present in the ceramic particulate material.

Embodiments of the present invention will now be described by way of example with reference to the accompanying drawings, in which:

DESCRIPTION OF EMBODIMENTS OF THE INVENTION

Figure 1:
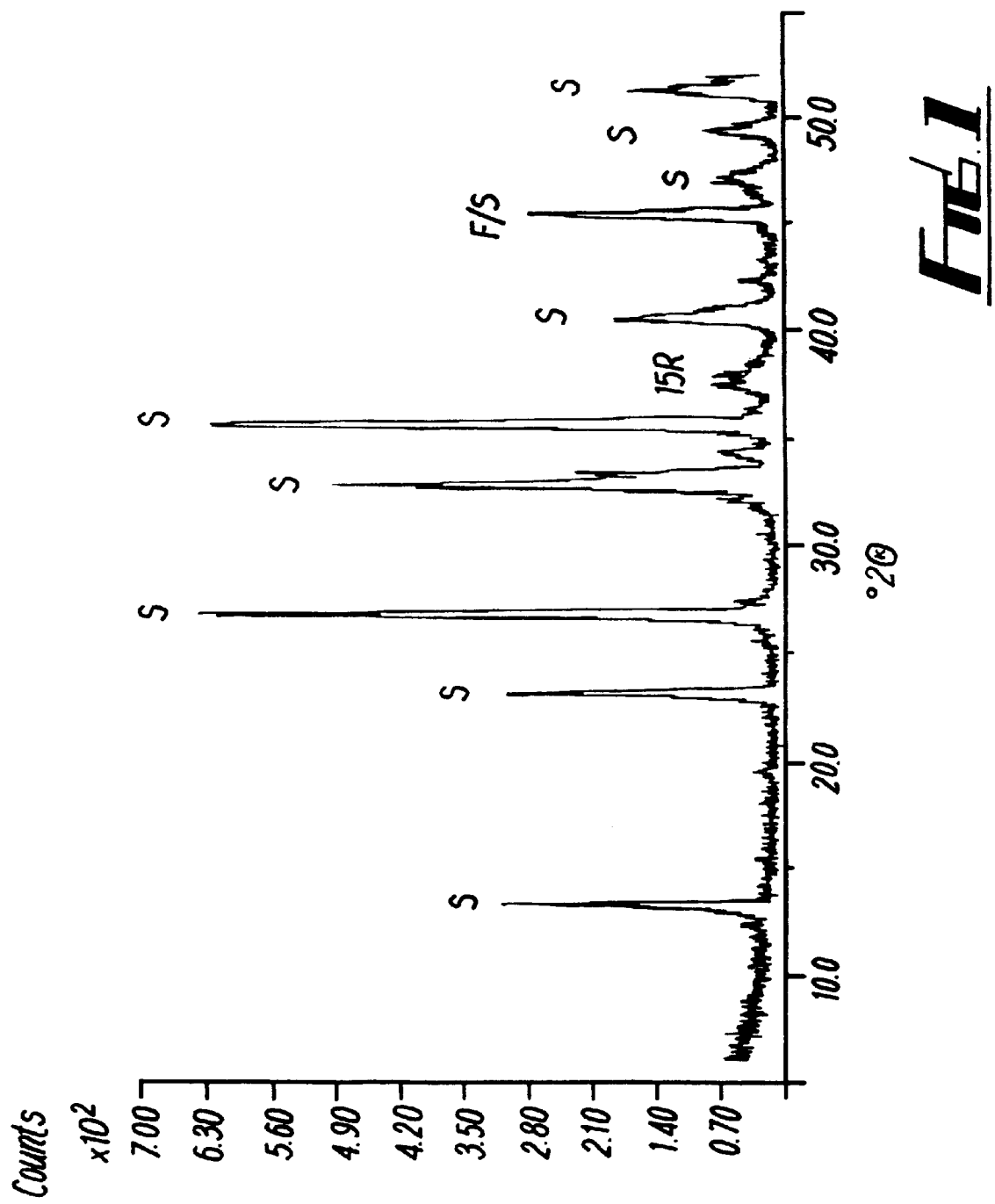
FIGS. 1 to 3 are graphs which are x-ray diffraction traces (reflected intensity versus angle) for sialon materials of different iron content.

The following Examples describe the preparation of sialon material and the application thereto of processing steps in accordance with embodiments of the invention.

EXAMPLE 1

(Preparation of β'-sialon)

A mixture of solid materials which consisted of 76% by weight of metakaolin, 20.2% by weight of carbon black and 3.8% by weight of ferric oxide was suspended in water containing 0.5% by weight, based on the total weight of the dry solids, of an ammonium polyacrylate dispersing agent to form a suspension containing 20% by weight of dry solids. The suspension was then dewatered by spray drying to give a fine powder. The metakaolin was prepared by calcining a kaolin from Georgia, USA, which had a particle size distribution such that 92% by weight consisted of particles having an equivalent spherical diameter smaller than 2 $\mu$m, and the metakaolin product had a level of impurities such that its $K_2O$ content was 0.09% by weight and its $Fe_2O_3$ content was 0.93% by weight, and a specific surface area, as measured by the BET nitrogen adsorption method of 15.1 $m^2g^{-1}$. The fine powder produced by spray drying was pelletised and sieved, and the granules having sizes in the range of from 0.7 to 1.0 mm were selected.

The pellets were introduced into a fluidised bed furnace which comprised a vertically mounted tube furnace provided with a mullite refractory tube lining of length 1200 mm and internal diameter 78 mm. A zone of length 600 mm within the furnace tube was maintained at a temperature in the range of from 1350 to 1500° C. The top of the mullite refractory tube was closed with a refractory plug, through which passed refractory tubes for, respectively, the introduction of granules of feed material, the escape of gaseous reaction products and the removal of the sialon product on completion of the reaction.

The lower half of the refractory tube was packed with alumina beads of diameters in the range from 3 to 5 mm. On top of these beads was placed a layer of thickness 10 mm of smaller alumina beads having diameters in the range of from 0.5 to 1 mm. Nitrogen gas was passed up the refractory tube through the bed of alumina beads, which provided a tortuous path for the gas, thus allowing the temperature of the gas to reach that of the furnace. The thinner layer of finer beads acted as a distributor for the nitrogen gas to ensure a uniform flow through the granules of feed material.

The nitrogen gas was introduced into the lower end of the mullite refractory tube at a rate of 10 $l.min^{-1}$, which corresponded to a linear velocity in the tube of approximately 0.034 m.s$^{-1}$. This flow rate was shown by calculation and by experiment to be in excess of that required to fluidise the bed of feed granules, but was chosen to ensure that the concentration of carbon monoxide in the gas leaving the furnace does not increase to the extent of limiting the rate of the reaction.

With the furnace temperature set at 1350° C., 200 g of the granules of feed material was introduced into the fluidised bed furnace over a period of 15 minutes by means of a vibratory feeder. The temperature of the furnace was then raised to 1500° C., again over a period of approximately 15 minutes. The granules were allowed to remain in the furnace until the concentration of carbon monoxide in the gas leaving the furnace had decreased to 0.1% by volume, a period of approximately 1.5 hours. At that point the furnace was cooled to a temperature of 1350° C., the flow rate of nitrogen gas was increased to 25 l.min$^{-1}$ and the granules were sucked out of the furnace through a mullite extraction tube connected to a metal cyclone and an extraction fan. The quantity of b'-sialon extracted was typically between 120 and 130 g. The flow rate of nitrogen gas was then reduced to 10 l.min$^{-1}$ and a second batch of 200 g of feed granules was introduced into the furnace. The cycle was repeated a number of times to accumulate a quantity of raw β'-sialon.

The raw β'-sialon was subjected to X-ray diffraction analysis and the trace shown in FIG. 1 was obtained. The peaks on the trace indicated by "S" are those which are typical of β'-sialon, and the trace indicates that β'-sialon predominates in the sample. The peak at a 2θ angle of 45.3° indicated by "F/S" shows that some ferrosilcon is present, and the small peaks at 2θ angles of 34.5° and 37.5° indicated by "15R" show the presence of a trace of 15R polytype, which is a phase within the Si—Al—O—N composition diagram, containing a higher proportion of aluminium than can be accommodated in the β'-sialon structure. 15R polytype is an impurity frequently found in sialon made from kaolin by carbothermal reduction. Its presence can indicate a small deviation from stoichiometry, either because slightly too much carbon was used, or because there has been some loss of silicon by volatilisation.

EXAMPLE 2

(Grinding of β'-sialon)

An attrition grinding mill was charged with 400 ml of water and 1.5 kg of clean Ottawa sand having particles ranging in size from 1.0 to 2.0 mm. 600 g of raw β'-sialon granules were then introduced into the grinding mill, and the pH of the suspension in the mill was maintained at 9.0 throughout the grinding operation by adding ammonia solution as required. Samples of ground β'-sialon were removed from the mill at intervals for particle size analysis, and the energy which had been dissipated in the suspension in the mill up to the time of removal of the sample was noted. The particle size analysis was performed using a "SEDI-GRAPH"® particle size analyser manufactured by Micromeritics Corporation, a specific gravity of 3.2 being assumed for β'-sialon. Table 1 below shows the percentage by weight of particles having an equivalent spherical diameter smaller than the stated values for a range of different amounts of energy dissipated in the suspension during grinding.

TABLE 1

| | Energy dissipated during grinding (kJ.kg$^{-1}$) | | | | | |
|---|---|---|---|---|---|---|
| % by wt. finer than | 0 | 421 | 731 | 1102 | 2702 | 3460 |
| 5 μm | 38.5 | 74.9 | 74.8 | 77.0 | 80.6 | 79.0 |
| 2 μm | 11.0 | 54.5 | 59.2 | 64.6 | 66.0 | 66.7 |
| 1 μm | 0 | 27.4 | 34.3 | 41.4 | 38.5 | 41.3 |
| 0.5 μm | 0 | 9.5 | 11.7 | 16.5 | 19.7 | 21.5 |

These results show that the β'-sialon becomes progressively finer as increasing amounts of energy are dissipated in the suspension during grinding.

EXAMPLE 3

(Differential Sedimentation of β'-sialon)

A sample of β'-sialon was subjected to attrition grinding as described in Example 2 above. 1800 kJ of energy per kilogram of dry β'-sialon was dissipated in the suspension and the resultant product (Sample A) was found to have a particle size distribution such that 70% by weight consisted of particles having an equivalent spherical diameter smaller than 2 μm.

The aqueous suspension containing Sample A was diluted with water to 13.0% by weight of dry solids, and there were added thereto 0.5% by weight, based on the weight of dry solids, of an ammonium polyacrylate dispersing agent, and sufficient ammonia solution to raise the pH to 9.0. The suspension was allowed to settle for a time which was calculated to be such that all particles having an equivalent spherical diameter larger than 2 μm would have sedimented. For β'-sialon, with a specific gravity of 3.2, this settling time was calculated to be 36.5 minutes per centimetre of depth. After this time, the supernatant suspension containing refined β'-sialon was decanted off, flocculated by lowering the pH to 2.8, filtered and the resultant cake dried. The dried, refined material was found to have a particle size distribution such that 87.8% by weight consisted of particles having an equivalent spherical diameter smaller than 2 μm.

Sample A, the refined β'-sialon and the sedimented residue were all analysed for iron content, expressed as equivalent percentage by weight of Fe$_2$O$_3$, and the results are set forth in Table 2 below.

TABLE 2

| Material | Fe in material, expressed as % by wt. Fe$_2$O$_3$ |
|---|---|
| Sample A | 4.35 |
| Refined β'-sialon | 0.35 |
| Sedimented residue | 13.2 |

These results show that the iron content of the refined β'-sialon has been substantially decreased relative to that of Sample A, and the iron content of the residue has correspondingly increased.

Figure 2:
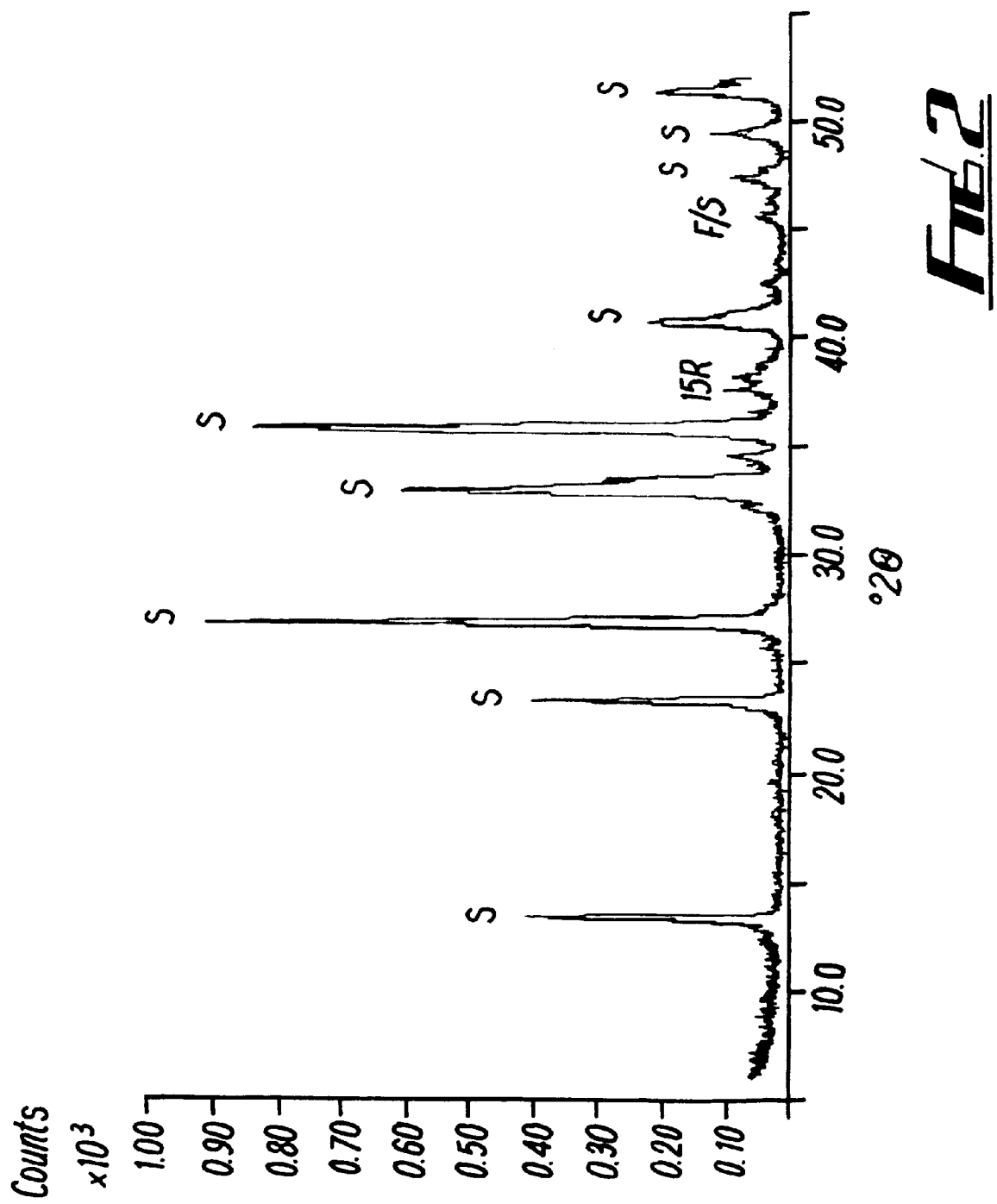
Figure 3:
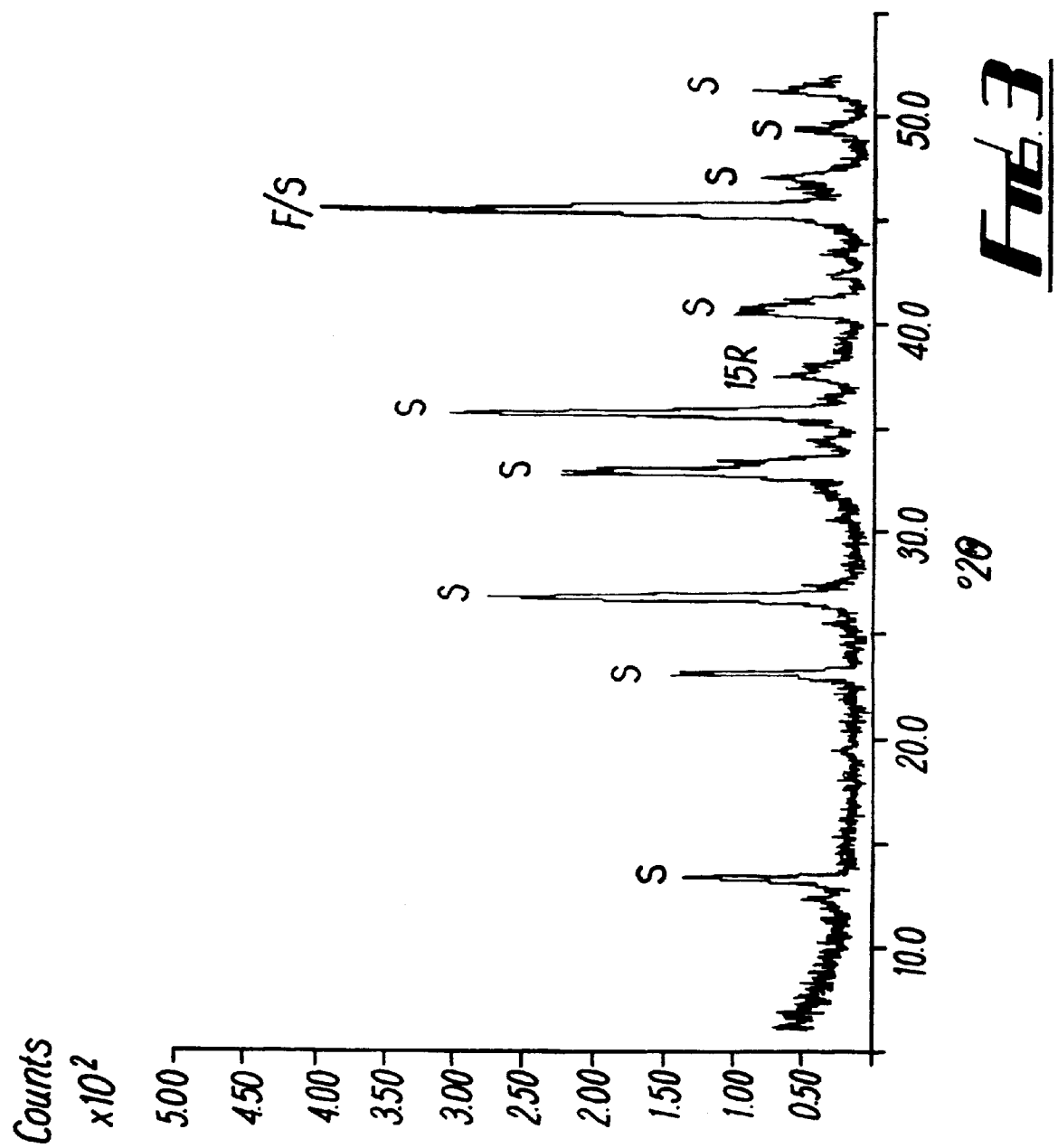

FIGS. 2 and 3 show X-ray diffraction traces for the refined β'-sialon and for the sedimented residue, respectively. It can be seen from FIG. 2 that the peak for ferrosilicon at a 2θ angle of 45.3° is very much reduced compared with that appearing in FIG. 1, indicating that the proportion of ferrosilicon in the refined β'-sialon has been reduced to a trace amount, as suggested by chemical analysis. In the trace shown in FIG. 3 the peak for ferrosilicon at a 2θ angle of 45.3° is very much increased, compared with the trace shown in FIG. 1. This again corresponds to the chemical analysis.

EXAMPLE 4
(Magnetic Separation)

Figure 4:
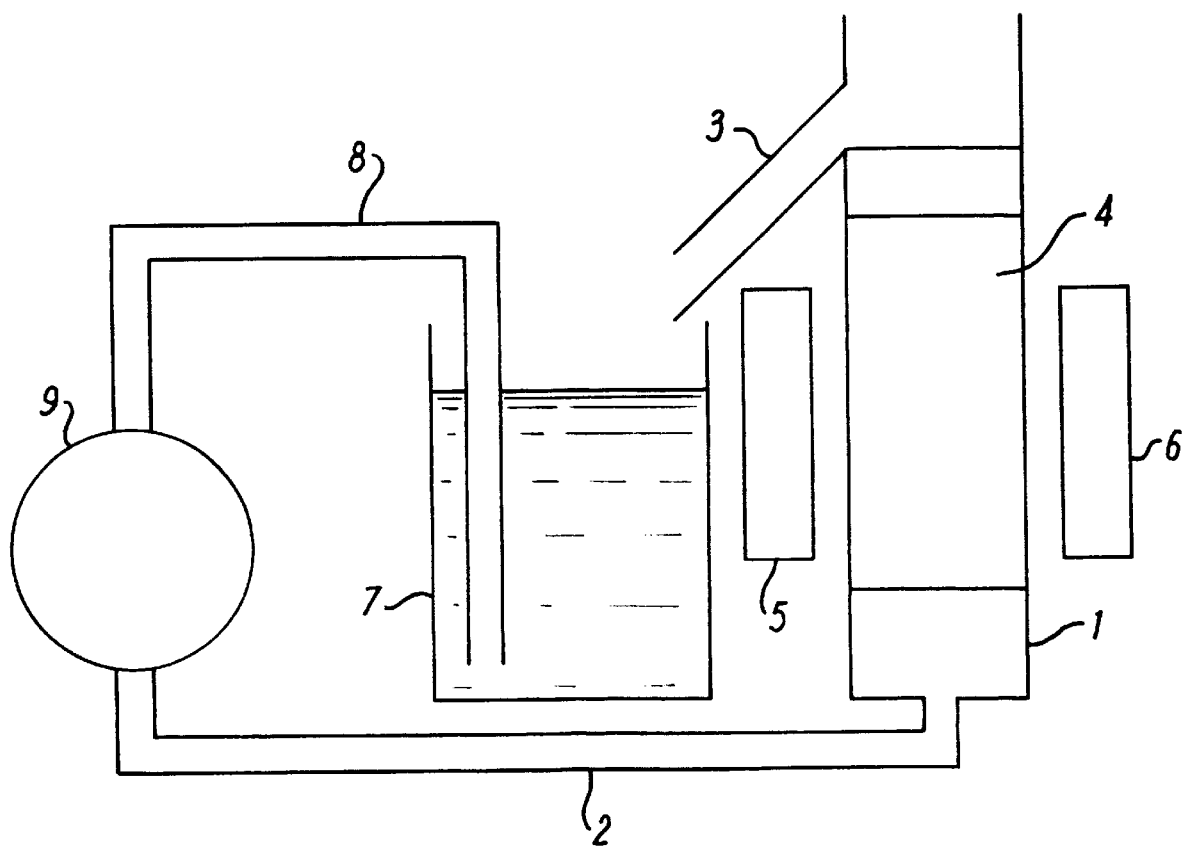
FIG. 4 is diagrammatic side view of an arrangement for carrying out magnetic separation.

A portion of Sample A was subjected to refining by magnetic separation using the apparatus shown diagramatically in FIG. 4. The apparatus comprised a glass tube 1 of diameter 1.5 cm and length 20 cm, which was mounted vertically with an inlet pipe 2 at its lower end, and an overflow pipe 3 at its upper end. The central section of tube 1 was packed with stainless magnetic wire wool 4, and the tube was positioned between the poles 5 and 6 of a permanent magnet which was capable of establishing a magnetic field of intensity 0.18 tesla. Suspension containing feed material was drawn from a reservoir 7 through a pipe 8 by means of a peristaltic pump 9. After passing up through the tube 1, the treated suspension was allowed to overflow back into the reservoir 7.

The aqueous suspension containing Sample A was diluted with water to 10.0 by weight of dry solids, and there were added thereto 0.5% by weight, based on the weight of dry solids, of an ammonium polyacrylate dispersing agent, and sufficient ammonia solution to raise the pH to 9.0. 100 ml of this diluted suspension was circulated through the tube 1 at a rate of 50 ml.min$^{-1}$ for a period of 10 minutes, after which time the non-magnetic portion overflowing the top of the tube was diverted to a separate receiver. Any b'-sialon suspension remaining in the tube was flushed through with water which was added to the reservoir 7 as it became empty. At the end of the experiment, the permanent magnet was removed, and the magnetisable component of the feed suspension which had been retained on the wire wool packing 4 was flushed through and collected separately.

After magnetic separation the non-magnetic fraction was found to have a particle size distribution such that 95.4% by weight consisted of particles having an equivalent spherical diameter smaller than 2 μm. This is considerably finer than the feed material (Sample A), and is also slightly finer than the β'-sialon which had been refined by differential sedimentation. This demonstrates that most of the magnetisable material removed would report in the coarser fractions in a particle size analysis, on account of its high specific gravity, as well as its coarse size.

The non-magnetic fraction and the magnetic fraction were analysed for iron content, expressed as percentage by weight of $Fe_2O_3$, and the results are set forth in Table 3 below, together with the result for Sample A.

TABLE 3

| Material | Fe in material, expressed as % by wt. $Fe_2O_3$ |
|---|---|
| Sample A | 4.35 |
| Non-magnetic fraction | 0.21 |
| Magnetic fraction | 11.9 |

X-ray diffraction analyses of the non-magnetic and magnetic fractions confirmed that, in the non-magnetic fraction, the ferrosilicon had been reduced to a trace amount, while, in the magnetic fraction, the peak for ferrosilicon at a 2θ angle of 45.5° is very much increased, compared with the trace shown in FIG. 1, indicating that the ferrosilicon has been concentrated in this fraction.

EXAMPLE 5
(Combination of Differential Sedimentation and Magnetic Separation)

A portion of the raw b'-sialon prepared in Example 1 was mixed with water in the presence of ammonia, and ground with an attrition grinding medium as described in Example 2, except that, in this case, the amount of energy dissipated in the suspension during the grinding operation was 3600 kJ per kilogram of dry solid material in the suspension. The ground product was designated "Sample B".

A portion of Sample B was subjected to differential sedimentation exactly as described in Example 3 above, and the refined b'-sialon thus obtained was designated "Sample C". Sample B, Sample C and the sedimented residue were analysed for iron content, expressed as percentage by weight of $Fe_2O_3$, and the results are set forth in Table 4 below.

TABLE 4

| Material | Fe in material, expressed as % by wt. $Fe_2O_3$ |
|---|---|
| Sample B | 4.35 |
| Sample C | 0.71 |
| Sedimented residue | 13.5 |

As was found in Example 3, a considerable reduction in the iron content of the refined fraction has been achieved. However, the improvement is not as good as that achieved in Example 3, possibly because a greater proportion of the ferrosilicon has been reduced to an equivalent spherical diameter smaller than 2 μm by the greater amount of energy dissipated in the suspension during grinding. This finer material would tend to remain in the refined fraction after sedimentation.

X-ray diffraction analysis confirmed that, although the amount of ferrosilicon in Sample C had been considerably reduced relative to the amount present in Sample B, the reduction was not so great as that which had been achieved in Example 3.

A further portion of Sample B was then subjected to refining by magnetic separation exactly as described in Example 4 above. The non-magnetic fraction and the magnetic fraction were analysed for iron content, expressed as percentage by weight of $Fe_2O_3$, and the results are set forth in Table 5 below, together with the result for Sample B.

TABLE 5

| Material | Fe in material, expressed as % by wt. $Fe_2O_3$ |
|---|---|
| Sample B | 4.35 |
| Non-magnetic fraction | 0.12 |
| Magnetic fraction | 8.2 |

These results show that, when the raw β'-sialon is ground under conditions such that 3600 kJ of energy per kilogram of dry solid material is dissipated in the suspension, the iron content of the non-magnetic fraction is slightly lower than that of the non-magnetic fraction obtained when the raw β'-sialon has been ground under conditions such that 1800 kJ of energy per kilogram of dry solid material is dissipated in the suspension. The iron content of the non-magnetic fraction is also considerably less than that of Sample C, which had been refined by differential sedimentation.

A portion of Sample C was further refined by magnetic separation using a laboratory superconducting magnetic separator ("CRYOFILTER"™, Model HGMS-6T/75, manufactured by Carpco, Inc.). The magnetic field intensity of this apparatus was 5 tesla. Sample C was suspended in sufficient water to give a solids concentration of 10% by weight, there being used as the dispersing agent 0.5% by weight, based on the weight of dry solids, of an ammonium polyacrylate and sufficient ammonia solution to raise the pH of the suspension to 11.0. The suspension was pumped through the matrix of the magnetic separator at a rate of 4 l.min.$^{-1}$. A single pass was effected with no recirculation. The non-magnetic fraction was collected, and the magnetic field was then switched off, and the magnetic fraction was flushed out. The magnetic and non-magnetic fractions were flocculated by lowering the pH to 3.5, filtered and the cakes thus formed were dried.

The non-magnetic fraction and the magnetic fraction were analysed for iron content, expressed as percentage by weight of $Fe_2O_3$, and the results are set forth in Table 6 below, together with the result for Sample C.

TABLE 6

| Material | Fe in material, expressed as % by wt. $Fe_2O_3$ |
|---|---|
| Sample C | 0.71 |
| Non-magnetic fraction | 0.07 |
| Magnetic fraction | 1.70 |

These results show that the operations of differential sedimentation and magnetic separation performed sequentially have yielded a final non-magnetic fraction which has an extremely low iron content.

X-ray diffraction analyses confirmed that the content of ferrosilicon in the non-magnetic fraction was very small, while the trace for the magnetic fraction showed a peak for ferrosilicon at a 2θ angle of 45.5°, which, although relatively small, was significant and clearly larger than that which appeared in the trace for Sample C.

What is claimed is:

1. A process for treating a nitride-containing ceramic material comprising:
   (1) comminuting the material to produce a particulate ceramic material having a particle size distribution such that at least 40% by weight of the particles have an equivalent spherical diameter (esd) smaller than 2 μm; and
   (2) subjecting the comminuted particulate ceramic material to ferrosilicon separation comprising subjecting the particulate ceramic material to differential sedimentation in a liquid medium to produce substantial separation of a light fraction from a heavy fraction, ferrosilicon required to be separated being included in the heavy fraction and refined particulate ceramic material being included in the light fraction.

2. A process as claimed in claim 1 and wherein the comminution step (1) comprises grinding in an aqueous medium using a hard particulate grinding medium.

3. A process as claimed in claim 1 and wherein the differential sedimentation is carried out in an aqueous medium.

4. A process as claimed in claim 1 and wherein the differential sedimentation is carried out in the presence of a dispersing agent.

5. A process as claimed in claim 1 and wherein the differential sedimentation is carried out by gravitational sedimentation or by centrifugation.

6. A process as claimed in claim 1 and wherein the differential sedimentation is carried out on the treated particulate ceramic material whilst in an aqueous suspension and, wherein the process further comprises dewatering and drying the treated particulate ceramic material.

7. A process as claimed in claim 6 and wherein the dewatering is carried out by flocculation of the particulate material in the suspending liquid medium followed by filtration.

8. A process as claimed in claim 1 and wherein the ferrosilicon separation step further comprises subjecting a suspension of the particulate ceramic material to magnetic separation to produce substantial separation of magnetic particulate material from non-magnetic particulate material, refined particulate ceramic material being included in the non-magnetic material.

9. A process as claimed in claim 8 and wherein the magnetic separation is effected by application of a magnetic field having an intensity of at least 0.05 tesla.

10. A process as claimed in claim 8 and wherein the magnetic separation step is carried out using a magnetic separation chamber which contains a porous body of magnetic material.

11. A process as claimed in claim 8 and wherein the communition step (1) comprises grinding in an aqueous medium using a hard particulate grinding medium.

12. A process as claimed in claim 8 and wherein the differential sedimentation is carried out in an aqueous medium.

13. A process as claimed in claim 8 and wherein the differential sedimentation is carried out in the presence of a dispersing agent.

14. A process as claimed in claim 8 and wherein the differential sedimentation is carried out by gravitational sedimentation or by centrifugation.

15. A process as claimed in claim 8 and wherein the later of the differential sedimentation or the magnetic separation is carried out on the treated particulate ceramic material whilst in an aqueous suspension and wherein the process further comprises dewatering and drying the treated particulate ceramic material.

16. A process as claimed in claim 15 and wherein the dewatering is carried out by flocculation of the particulate material in the suspending liquid medium followed by filtration.

17. A process for treating a nitride-containing ceramic material comprising:
   (1) comminuting the material to produce a particulate ceramic material having a particle size distribution such that at least 40% by weight of the particles have an equivalent spherical diameter (esd) smaller than 2 μm; and
   (2) subjecting the comminuted particulate ceramic material to ferrosilicon separation comprising subjecting a suspension of the particulate ceramic material to magnetic separation to produce substantial separation of magnetic particulate material from non-magnetic particulate material, refined particulate ceramic material being included in the non-magnetic material.

18. A process as claimed in claim 17 and wherein the communition comprises grinding in an aqueous medium using a hard particulate grinding medium.

19. A process as claimed in claim 17 and wherein the magnetic separation is effected by application of a magnetic field having an intensity of at least 0.05 tesla.

20. A process as claimed in claim 17 and wherein the magnetic separation is carried out using a magnetic separation chamber which contains a porous body of magnetic material.

21. A process as claimed in claim 20 and wherein the magnetic separation is carried out on the treated particulate ceramic material whilst in an aqueous suspension and wherein the process further comprises dewatering and drying the treated particulate ceramic material.

22. A process as claimed in claim 21 and wherein the dewatering is carried out by flocculation of the particulate material in the suspending liquid medium followed by filtration.

* * * * *